United States Patent [19]

Kedem et al.

[11] 4,217,200
[45] Aug. 12, 1980

[54] MEMBRANES

[75] Inventors: Ora Kedem; Abraham Kedem, both of Rehovot; Menashe Lev, Ramt-Gan; Gerald B. Tanny, Rehovot; Rami Messalem, Beer Sheva, all of Israel

[73] Assignee: Yeda Research & Development Co. Ltd., Rehovot, Israel

[21] Appl. No.: 932,406

[22] Filed: Aug. 9, 1978

[30] Foreign Application Priority Data

Aug. 16, 1977 [IL] Israel .......................................... 52757

[51] Int. Cl.² ............................................. B01D 13/02
[52] U.S. Cl. ................................. 204/301; 204/180 P; 204/296
[58] Field of Search ....................... 204/301, 180 P, 296

[56] References Cited

U.S. PATENT DOCUMENTS

| 2,810,686 | 10/1957 | Bodamer et al. | 204/301 X |
| 3,271,292 | 9/1966 | Kollsman | 204/301 X |
| 3,488,276 | 1/1970 | Tarsey | 204/301 |
| 3,657,105 | 4/1972 | In'T Veld | 204/301 |

OTHER PUBLICATIONS

Wilson, "Demineralization by Electrodialysis," (1960), pp. 138–141.

Primary Examiner—Arthur C. Prescott
Attorney, Agent, or Firm—Browdy and Neimark

[57] ABSTRACT

According to the present invention there is provided a novel type of membrane unit for use in electrodialysis comprising a heat-sealable frame framing and forming an integral entity with an electrodialysis membrane. The frame may be a regular frame, or a two-frame structure framing a single membrane. The invention further relates to electrodialysis devices such as stacks, bags, cells, spiral units and the like based on such membrane units, which are hermetically bonded by heat-sealing to similar units or to polymeric or other members.

15 Claims, 6 Drawing Figures

MEMBRANES

FIELD OF THE INVENTION

The present invention relates to improvements in membranes of the type used in desalination devices based on electrodialysis and similar electrochemical processes. The invention relates to novel units for use in electrodialysis devices based on such membrane units which are conveniently assembled in the form of stacks and other arrangements, said units being adapted to form easily sealable devices.

BACKGROUND OF THE INVENTION

Numerous types of electrodialysis membranes have been described and many arrangements of such membranes in electrodialysis devices, such as stacks and the like are known. One of the main problems is due to the close proximity of membranes to each other and the necessity to form a tight seal between adjacent membranes and gaskets. Generally electrodialysis membranes are not suited for attachment by heat-sealing to polymeric or other gaskets. It is very hard to form a good bond between such membranes and spacers or gaskets, and as any leak causes damage to the process and equipment and this constitutes a serious problem. Due to the impossibility to obtain an integral unit of conventional ion exchange membranes with spacers or gaskets, quite complicated mechanical and other means are resorted to. In spite of this it is generally not possible to entirely eliminate leaks. Such devices are also complicated and expensive.

SUMMARY OF THE INVENTION

According to the present invention there are provided dimensionally stable entities comprising an ion exchange membranes forming an integral unit with a frame, which frame is characterized in that it can be attached by heat-sealing to similar frames of other membranes or to other, preferably polymeric, members forming a hermetic seal. Furthermore the invention relates to various products made from such entities, i.e. membranes framed in a heat-sealable frame, such as bags or multi-bag arrangements of similar or different types of ion exchange membranes. According to a preferred embodiment of the invention there are provided bags made of two such membranes, one a cation selective membrane, the other an anion selective membrane, each of which membranes is framed in and forms an integral unit with a polymeric frame which is heat-sealable, said frames being attached to each other by heat sealing so as to form a hermetic seal around the circumference of the said frame entry and exit means being provided in the thus formed bag. According to yet a further preferred embodiment a plurality of such bags is arranged in a consecutive arrangement with suitable passages from one bag to the other or to the following bag, so as to form an electrodialysis unit.

Using the means described above a plurality of framed anion exchange membrane units or cationexchange membrane units can be prepared in the form of a long continous strip. A strip of cationexchange membranes and a similar strip of anion exchange membranes are sealed together along their upper and lower edges and across the strip and equal intervals forming a plurality of compartments. Each of the compartments thus formed is provided with an outlet. The thus formed series of unit cells is mechanically continuous but functionally separate. When such composite strip is wound into a spiral together with a suitable spacer, the spiral shaped unit can be used for electrodialysis with concentric ringelectrodes. Crossflow of dialysate is possible in the spiral shaped space defined by the unit cells containing brine.

According to a further embodiment, syphon means are provided in combination with a membrane unit, adapted to automatically syphon off a predetermined quantity of concentrate from the bottom of the unit so that precipitates which may have found are carried along with the concentrate and do not accumulate inside the sealed membrane unit.

The most simple embodiment of the invention comprises an ion exchange membrane of the type used in electrodialysis stacks, such as an anion selective or a cation selective membrane, framed in and forming an integral unit with a polymeric frame, which frame is heat-sealable with other polymeric materials. Membranes of such type can be produced by reacting a rectangular area of a polymeric sheet so as to convert it into an ion exchange membrane, leaving a frame of suitable width surrounding said rectangular ion exchange membrane, said frame being constituted of unreacted heat-sealable polymeric material.

According to a further embodiment of the invention a chemically resistant net or the like, such as glass fiber net or mat, polyfluorotetraethylene net or mat or the like is used as reinforcement for a polyethylene film and this polyethylene film is reacted in such manner that an unreacted frame of suitable size is left surrounding the reacted portion so as to form a framed ion-exchange membrane. The inner part may be sulfchlorinated leaving a surrounding frame of unreacted polyethylene which can be easily heat-sealed to similar polyethylene.

Low density polyethylene can be advantageously reinforced by a high density polyethylene net or nonwoven fabric.

Another embodiment of framed membranes according to the invention comprises a porous dimensionally stable inert support framed in an inert impervious frame, said porous support supporting and forming an integral member with material resulting in an ion-exchange membrane. For example, porous polypropylene such as "Celgard" is heat sealed into a frame of ordinary polypropylene, and the Celgard portion is coated with a suitable water insoluble polymer carrying suitable functional groups, such an anionic ionizable groups such as sulfonated polysulfones to transforming it into a cation exchange membrane, or a polymer carrying cationic ionizable groups such as modified polyphenylene-oxide transforming it into an anion exchange membrane. A dense regular non-woven fabric framed in a plastic heat-sealable sheet of the same material can be coated by a water insoluble polymer carrying ionizable groups.

Other and further features of the invention will become apparent hereinafter.

BRIEF DESCRIPTION OF THE DRAWINGS

The invention is illustrated with reference to the enclosed schematical drawings, which are not according to scale and in which.

DESCRIPTION OF THE PREFERRED EMBODIMENTS

Figure 1:
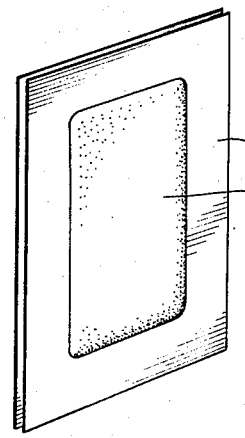
FIG. 1 is a perspective view of a membrane according to the invention.

As shown in FIG. 1, a membrane unit according to the present invention comprises a frame 11, made of a heat-sealable material such as polyethylene or polypropylene, or any other suitable polymeric material, and a framed area 12, consisting of a treated area of said polyalkylene sheet, which has thus been converted to an ion specific membrane, or said framed area 12 is a porous support, heat sealed to the frame 11, and coated with a suitable coating converting it to a permselective membrane.

Figure 2:
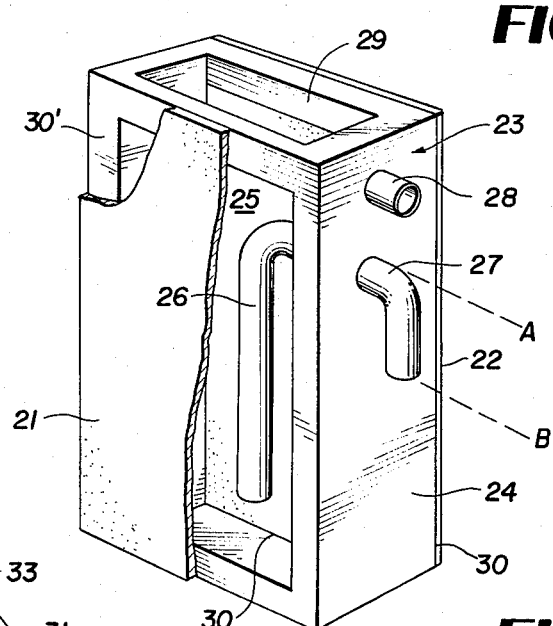
FIG. 2 is a perspective view of a syphon unit according to the invention.

The syphon unit shown in FIG. 2 comprises two permselective membranes 21 and 22 respectively which form two opposite walls of the box-like structure 23, which comprises an outer frame 24, and defines an inner space 25, into which there protrudes the bent tube 26, which reaches to a certain level about the floor of the inner space, and the outward end of which is at a level well above that of the inner end. When dialysate accumulates during electrodialysis in the said inner space 25 and reaches a level above the upper level of the portion 27 of the bent tube, the part of the liquid in the structure 23 which is between A and B will be syphoned off, and this is repeated every time the level of the liquid in the structure will reach level A. A second tubing 28 is provided which reaches into the interior space of the structure and which connects this with the outside. This constitutes a safety overflow. The boxlike structure is advantageously open at its upper and 29. The membranes units 21 and 22 are according to the present invention, comprising a frame which is heat-sealable to a polymeric supprt, and which frames an active membrane area. These frames are conveniently heat-sealed to the surfaces 30 and 30' of the frame 23 of the box. An area of the membrane above line B, or part of it, may consist of unreacted heat-sealable film, not being an active membrane.

Figure 3:
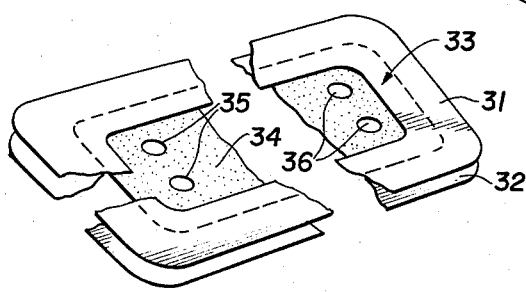
FIG. 3 is a perspective view in partical section of a membrane unit according to the invention with a double frame.
Figure 4:
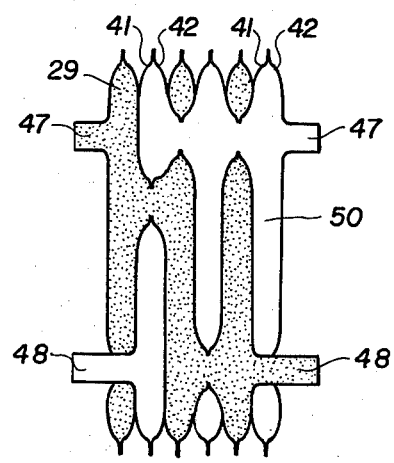
FIG. 4 is a sectional side view through a plural compartment membrane system according to the invention.

The membrane unit shown in FIG. 3 comprises two frames 31 and 32 which frame the rectangular electrodialysis membrane 34, which forms an area of overlap with the frames, which area of overlap is used for heat-sealing of the frames to said membrane. A Celgard seal may be applied to the sealed area to provide further strength of the bond. There may be provided holes 35 and 36, which are used for establishing conduits to adjacent framed membrane units, as shown in FIG. 4. When the electrodialysis membrane 34 is based on a non-woven fabric, this fabric is heat sealed to the frames and there is applied to it a layer of a suitable material which provides the ion-selective properties of the membranes.

FIG. 4 illustrates an "accordion-like" structure formed by heat-sealing the adjacent "flaps" of a plurality of double-frame membrane units of the type illustrated with reference of FIG. 3. As shown, consecutive "flaps" 41 and 42 are heat sealed to each other, and tubular input and output means 47 and 48 are provided, the double-flapped membrane units and the suitably joined openings therein, dividing the resulting inner space into connected brine compartments 49 and dialysate compartments 50.

Figure 5:
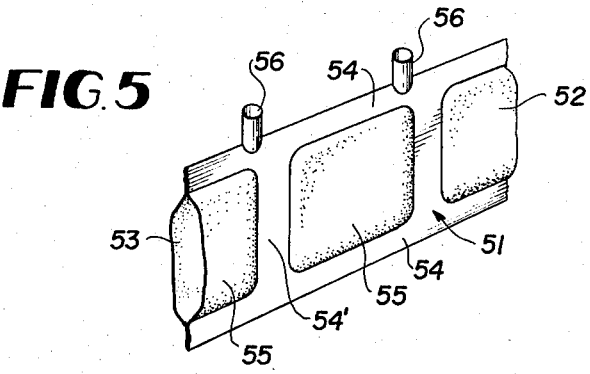
FIG. 5 is a sectional perspective view of a strip comprising a plurality of compartments of electrodialysis membranes.
Figure 6:
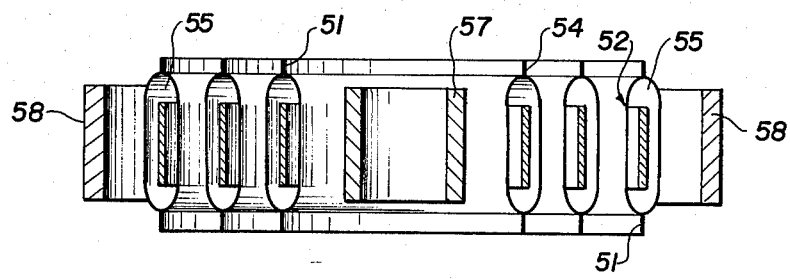
FIG. 6 is a sectional side view through a spiral electrodialysis unit comprising a strip of the type shown in FIG. 5 in combination with an electrode system.

FIG. 5 illustrates a is a perspective view of a section of a strip comprising a plurality of compartments. This strip comprises a frame 51 made of a heat-sealable polymeric mateiral, framing a plurality of cation exchange membranes 52 facing one direction and anion exchange membrane 53 facing the other direction, which are heat-sealed to the frame. The frame comprises two parallel identical strips with suitable openings which are sealed together along their upper and lower edges 54 and along the strips 54', this forming unit cells 55, which are provided with individual outlets 56. Such strips can be used in the form of spiral-shaped electrodialysis modules. Such a module is illustrated in FIG. 6 where the strip of the type illustrated in FIG. 5 is formed into a spiral-shaped electrodialysis unit; the various components being designated as in FIG. 5. At the center of the spiral-shaped electrodialysis membrane strip there is provided the circular electrode 57, while the spiral is surrounded by electrode 58. The unit is immersed in a solution which is to be subjected to electrodialysis and the process is effected in a conventional manner.

The following Examples illustrate the preparation of some membrane-units according to the present invention, and some of the uses of these. It is clear that the heat-sealable frames provide a wide variety of possible uses. The following Examples are intended to illustrate the present invention and these are to be construed in a non-limitative manner.

EXAMPLE 1

Two sheets of low-density polyethylene, of 50 micron thickness, were laminated to a glass fiber scrim fabric (product of J. P. Stevens, 1620, USA) in a vacuum oven (for bubble-free laminates). A rectangular sheet (11 × 18 cm) was fastened between a pair of identical rigid frames of polyvinylchloride with the aid of double-sided, chemically resistant adhesive tape leaving exposed an area of 8 × 15 cm. The thus framed membrane was photochemically sulphonated, according to the procedure of Korosi et al. (Israeli Pat. No. 14720 and British Pat. No. 981562) and hydrolized, resulting in a highly permselective and shape stable cation exchange membrane in the exposed area. After completion of the chemical reactions, the PVC frame was removed, exposing a frame of unreacted laminated polyethylene which was unitary and integral with the cation exchange membrane.

The cation exchange membrane had an ion exchange capacity of 1,4 meq/g dry weight. The restistance was found to be 10 $\Omega$ cm$^2$, transport number of Na$^+$ as measured in NaCl solutions of varying concentrations:

| Concentration of NaCl, mol/liter | 0.1–0.2 | 0.5–1 | 1–2 |
|---|---|---|---|
| Transport number of Na$^+$ | 95 | 90 | 90 |

EXAMPLE 2

A sulphochlorianted framed membrane, prepared according to Example 1 was treated with a diamine and quarternized, following said patent. A highly permselective anion exchange membrane (8×15 cm) was obtained, frame by a frame of unreacted laminated polyethylene.

EXAMPLE 3

A rectangular sheet of hydrophobic Celgard, grade 2004, 8×15 cm, was heat-sealed into frames of polyethylene (100μ) or polypropylene (50μ). The resulting sheet of 11×8 cm was immersed in a 5% solution of sulphonated polysulphone, air dried, immersed briefly a second time into the same solution and air dried. A highly permselective, non-swelling cation-exchange membrane was obtained, with a permanently attached heat-sealable frame. Cation exchange capacity of the sulphonated polysulphone: 1,2 meq/g dry weight.

| Concentration of NaCl, mol/liter | 0.1–0.2 | 0.3–1 | 1–2 |
|---|---|---|---|
| Transport number of Na$^+$ | 97 | 90 | 95 |

EXAMPLE 4

Single sheets of low-density polyethylene, 50 micron thickness, were laminated to a high-density non-woven polyethylene fabric (Delnet R 520 or X 220, produced by Hercules Inc.). A frame of high density polyethylene was attached by heat-sealing around the sheets leaving an effective area of 8 cm times 15 cm. The framed sheets were reacted according to Example 1 and 2, resulting in cation-selective and anion-selective membranes in the reacted low-density polyethylene areas, respectively. Local swelling took place, but no dimensional shape changes were apparent. The resistance of the cation-exchange membranes was 0.5 to 1.5 $\Omega$ cm$^2$. The resistance of the anion-exchange membranes was 2 to 4$\Omega$cm$^2$. Although a certain reaction took place at the surface of the high-density frame, this retained its heat-sealing properties and the frame of the anion-selective membrane could be heat-sealed to the frame of the cation-selective membrane without problems.

EXAMPLE 5

There were prepared laminates of low-density polyethylene strips to a high-density net of polyethylene as set out in Example 4. Strips of high-density polyethylene were heat-sealed along the upper and lower edges of the strips, and at predetermined distance from each other there were also attached masking strips of PVC or any other suitable masking material, preventing the photo-chemical reaction on the masked parts of the strip, which could be used afterwards for heat-sealing. The strips were treated as set out in Example 1 and 2 producing cation- and anion-specific membranes.

EXAMPLE 6

A sheet of non-woven polypropylene fabric (Delnet, T.M.), of 8×15 cm was sealed into a frame of polypropylene leaving a free edge of about 2 mm of the fabric outside the seal. The composite sheet was fastened to a horizontal glass plate and there was cast on it a 10 percent solution of sulfonated polysulfone, with a coating knife with an opening of 200μ. After evaporation the polysulfone film was readily removed from the polypropylene frame, but remained firmly attached to the fabric including the free edge forming the seal. No leaks were observed, and the permselectivity measured with the seal exposed to the solutions was practically ideal in solutions of sodium chloride solutions of 0.01 N to 0.2 N.

EXAMPLE 7

A cationic framed membrane unit described in Example 1 was attached by heat sealing around the edges of the frame to an anionic membrane unit of Example 2. At a level slightly below the lower edge of the upper frame there was provided an "L-shaped" downwardly pointing outlet tube heat-sealed and connected with the interior of the thus formed bag-like structure. This can be used as unit cell in open electrodialysis stacks by processing feed solutions containing 200–5000 ppm dissolved NaCl and NaHCO$_3$, concentrated brine was obtained from the unit cell through the outlet, containing up to 11% dissolved sodium salts. With a feed solution containing 1300 ppm NaCl and 120 ppm NaHCO$_3$, at a current density of 20 mA/cm$^2$ the brine solution in the unit cell contained 10.8% NaCl and 0.6% NaHCO$_3$. The coulombic efficiency was 80%.

EXAMPLE 8: Sealed Unit Cell with Syphon Outlet

A cationic and an anionic framed membrane described in Example 4 and respectively, were sealed to a rigid frame of polyethylene, provided with a specially shaped outlet, as represented in FIG. 2. The brine solution, accumulating in the cell upon passage of current, was partially syphoned off, after reaching the level A of FIG. 2, carrying with it precipitates. The rigid box with the syphon outlet was inserted into an open electrodialysis stack. The feed solution was Rehovot tap water, containing in addition 2000 ppm NaCl. Current was passed at 20 mA/cm$^2$. The precipitate accumulated at the bottom was removed periodically together with the brine solution through the syphon outlet. The filtered brine solution contained 8% NaCl.

Example 9: Sealed Stack

To each of three framed cation exchange membranes units described in Example 4, framed anion exchange membrane units as described in the same Example, additional frames were welded as described with reference to FIG. 4. The double frame membrane units were joined by heat sealing so as to form a small stack, as shown in FIG. 4, and provided with inlet and outlet means. 20 liters each of a solution containing initially 3% sodium chloride was circulated through both dialysate and brine stream. A total current of 4 A was passed through the stack of active area 120 cm$^2$. After 24 hours, the concentration in the dialysate compartment was reduced to 0.3% NaCl and the concentration in the brine compartment had increased about two-fold.

The voltage on the three cell pairs, not including the electrode compartments, was about 1.2 V at the start and about 2 V at the end of the experiment.

Example 10: Spiral of Unit Cells

Using the strips of Example 5, continuous strips were prepared defining 20 units each membrane of 8×15 cm, each framed by a frame of 3 cm width of high density polyethylene, thickness 50 micron. A cation exchange strip and an anion exchange strip were sealed together along the upper and lower edges and across the strip defining the units. Polyethylene capillary tubes of 1 mm diameter were sealed into the frame, providing individual outlets for each compartment. A spiral was formed of the sealed strip together with a 1 mm polyethylene spacer (product of Nalle Plastics Inc). The spiral was inserted into the annular space between two concentric electrode compartments, bounded by cation exchange membranes. The outer diameter of the inner electrode was 10 cm and the inner diameter of the outer electrode was 15 cm.

A solution containing 2000 ppm of sodium chloride was passed through the spiral, the direction of flow being parallel to the axis of the spiral unit. A current of 3 amperes was passed between the electrodes. A concentrated solution of sodium chlorode, containing 80,000 ppm was collected from the outlets of the spiral.

We claim:

1. A membrane unit for use in electrodialysis comprising a sheet having an area constituting an active ion exchange membrane and a region surrounding said active membrane area, said surrounding area being of thermoplastic heat-sealable material, both said areas being integral parts of the same sheet.

2. A membrane unit according to claim 1 wherein the surrounding region is polyalkylene and the active membrane comprises polyalkylene converted to a permselective membrane.

3. A membrane according to claim 2 wherein the polyalkylene is polyethylene or polypropylene.

4. A membrane unit according to claim 1 wherein the surrounding region is sealed to a porous sheet which constitutes the area to be made active, said porous sheet serving as support of a substance which imparts to the porous area properties of a permselective membrane.

5. A membrane unit according to claim 4 wherein the material supported by the porous support is polymerized on same and converted to a permselective membrane.

6. A membrane unit according to claim 1 comprising a double-frame framing a permselective membrane, each of said frames being adapted to be attached by heat-sealing to similar adjacent membrane units.

7. An electrodialysis device comprising an inert frame structure defining a compartment, at least one of the walls of which is constituted by a framed membrane unit according to claim 1.

8. An electrodialysis device according to claim 7, wherein a syphon is provided for syphoning off a predetermined quantity of liquid when the level of the liquid reaches a certain level in said compartment.

9. Electrodialysis bags comprising two different membrane units according to claim 1, attached with each other along the surrounding regions, provided with exit means for the liquid.

10. A membrane unit according to claim 1 comprising a strip of a plurality of individual dialysis compartments, each of which is provided with outlet means.

11. An electrodialysis device comprising a spiral arrangement of a strip according to claim 10, positioned in the annular space between two cylindrical electrodes.

12. A unitary and integral membrane unit according to claim 1, formed by providing a said thermoplastic heat-sealable sheet and treating said sheet to provide said active ion exchange area while maintaining the periphery of the sheet in its thermoplastic heat-sealable form.

13. A membrane unit according to claim 12, wherein said sheet is reinforced with a chemically resistant net, mat or fabric.

14. A membrane unit according to claim 12, wherein said treating comprises masking the periphery of said sheet, subjecting said sheet to conditions to effect conversion thereof to ion exchange membrane, and stripping of said mask from the periphery to leave the untreated surrounding region.

15. A membrane unit according to claim 4, formed by laminating a thermoplastic frame element to a thermoplastic porous sheet, and then coating said porous sheet with a material to form said active area.

* * * * *